(12) United States Patent
Stein et al.

(10) Patent No.: US 7,508,937 B2
(45) Date of Patent: Mar. 24, 2009

(54) PROGRAMMABLE DATA ENCRYPTION ENGINE FOR ADVANCED ENCRYPTION STANDARD ALGORITHM

(75) Inventors: Yosef Stein, Sharon, MA (US); Haim Primo, Tikwa (IL)

(73) Assignee: Analog Devices, Inc., Norwood, MA (US)

( * ) Notice: Subject to any disclaimer, the term of this patent is extended or adjusted under 35 U.S.C. 154(b) by 638 days.

(21) Appl. No.: 10/255,971

(22) Filed: Sep. 26, 2002

(65) Prior Publication Data

US 2003/0133568 A1    Jul. 17, 2003

Related U.S. Application Data

(60) Provisional application No. 60/341,634, filed on Dec. 18, 2001.

(51) Int. Cl.
*H04K 1/04* (2006.01)
(52) U.S. Cl. .................. 380/37; 713/187; 713/188; 713/189; 713/190
(58) Field of Classification Search .......... 713/1, 713/2, 188, 194; 380/200, 201, 255, 277, 380/37; 726/2; 708/492
See application file for complete search history.

(56) References Cited

U.S. PATENT DOCUMENTS

| | | |
|---|---|---|
| 3,303,477 A | 2/1967 | Voigt |
| 3,805,037 A | 4/1974 | Ellison |
| 4,322,577 A | 3/1982 | Brandstrom |
| 4,685,132 A | 8/1987 | Bishop et al. |
| 4,722,050 A | 1/1988 | Lee et al. |
| 4,847,801 A | 7/1989 | Tong |
| 4,852,098 A | 7/1989 | Brechard et al. |
| 4,918,638 A | 4/1990 | Matsumoto et al. |
| 5,062,057 A | 10/1991 | Blacken et al. |
| 5,095,525 A | 3/1992 | Almgren et al. |
| 5,101,338 A | 3/1992 | Fujiwara et al. |

(Continued)

FOREIGN PATENT DOCUMENTS

EP    1 246 389 A1    10/2002

(Continued)

OTHER PUBLICATIONS

2001 IEEE Workshop on Signal Processing Systems, pp. 349-360, title "Rijndael EPGA implementation utilizing look-up tables", date "Dec. 31, 1969", author "McLoone et al."*

(Continued)

*Primary Examiner*—Kimyen Vu
*Assistant Examiner*—Joseph Pan
(74) *Attorney, Agent, or Firm*—Iandiorio Teska & Coleman

(57) ABSTRACT

A programmable data encryption engine for performing the cipher function of an advanced encryption standard (AES) algorithm includes a parallel look-up table system responsive in a first mode to a first data block for implementing an AES selection function and executing the multiplicative inverse in $GF^{-1}(2^8)$ and applying an affine over GF(2) transformation to obtain a subbyte transformation and in a second mode to the subbyte transformation to transform the subbyte transformation to obtain a shift row transformation, and a Galois field multiplier for transforming the shift row transformation to obtain a mix column transformation and add a round key resulting in an advanced encryption standard cipher function of the first data block.

12 Claims, 13 Drawing Sheets

U.S. PATENT DOCUMENTS

| | | | |
|---|---|---|---|
| 5,214,763 A | 5/1993 | Blaner et al. |
| 5,379,243 A | 1/1995 | Greenberger et al. |
| 5,386,523 A | 1/1995 | Crook et al. |
| 5,446,850 A | 8/1995 | Jeremiah et al. |
| 5,502,665 A | 3/1996 | Im |
| 5,642,367 A | 6/1997 | Kao |
| 5,689,452 A | 11/1997 | Cameron |
| 5,696,941 A | 12/1997 | Jung |
| 5,754,563 A | 5/1998 | White |
| 5,768,168 A | 6/1998 | Im |
| 5,832,290 A | 11/1998 | Gostin et al. |
| 5,996,057 A | 11/1999 | Scales, III et al. |
| 5,996,066 A | 11/1999 | Yung |
| 5,999,959 A | 12/1999 | Weng et al. |
| 6,049,815 A | 4/2000 | Lambert et al. |
| 6,067,609 A | 5/2000 | Mecker et al. |
| 6,121,791 A | 9/2000 | Abbott |
| 6,138,208 A | 10/2000 | Dhong et al. |
| 6,182,216 B1 * | 1/2001 | Luyster | 713/168 |
| 6,199,086 B1 | 3/2001 | Dworkin et al. |
| 6,199,087 B1 | 3/2001 | Blake et al. |
| 6,208,163 B1 | 3/2001 | Wittig et al. |
| 6,223,320 B1 | 4/2001 | Dubey et al. |
| 6,230,179 B1 | 5/2001 | Dworkin et al. |
| 6,246,768 B1 | 6/2001 | Kim |
| 6,285,607 B1 | 9/2001 | Sinclair |
| 6,298,136 B1 | 10/2001 | Den Boer |
| 6,317,763 B1 | 11/2001 | Vatinel |
| 6,349,318 B1 | 2/2002 | Vanstone et al. |
| 6,377,969 B1 | 4/2002 | Orlando et al. |
| 6,384,713 B1 | 5/2002 | Yu |
| 6,389,088 B1 | 5/2002 | Blois et al. |
| 6,415,030 B2 | 7/2002 | Matsui et al. |
| 6,434,662 B1 | 8/2002 | Greene et al. |
| 6,480,845 B1 | 11/2002 | Egolf et al. |
| 6,539,477 B1 | 3/2003 | Seawright |
| 6,587,864 B2 | 7/2003 | Stein et al. |
| 7,003,106 B2 * | 2/2006 | Ouyang | 380/28 |
| 7,305,085 B2 * | 12/2007 | Ohkuma et al. | 380/42 |
| 2002/0003876 A1 | 1/2002 | Lim |
| 2002/0021802 A1 | 2/2002 | Muratani et al. |
| 2002/0041685 A1 | 4/2002 | McLoone et al. |
| 2002/0051537 A1 | 5/2002 | Rogaway |
| 2002/0147825 A1 | 10/2002 | Stein et al. |
| 2002/0159599 A1 | 10/2002 | Matsui et al. |
| 2003/0039355 A1 | 2/2003 | McCanny et al. |
| 2003/0053623 A1 | 3/2003 | McCanny et al. |
| 2003/0103626 A1 | 6/2003 | Stein et al. |
| 2003/0105791 A1 | 6/2003 | Stein et al. |
| 2003/0110196 A1 | 6/2003 | Stein et al. |
| 2003/0115234 A1 | 6/2003 | Stein et al. |
| 2003/0140211 A1 | 7/2003 | Stein et al. |
| 2003/0140212 A1 | 7/2003 | Stein et al. |
| 2003/0140213 A1 | 7/2003 | Stein et al. |
| 2003/0149857 A1 | 8/2003 | Stein et al. |
| 2004/0145942 A1 | 7/2004 | Leijten-Nowak |
| 2005/0058285 A1 | 3/2005 | Stein et al. |

FOREIGN PATENT DOCUMENTS

| | | |
|---|---|---|
| GB | 0107592.8 | 7/1967 |
| GB | 0108392.2 | 9/1967 |
| JP | 2001/034167 | 2/2001 |
| JP | 2001/084242 | 3/2001 |

OTHER PUBLICATIONS

Viktor Fischer, *Realization of the Round 2 AES Candidates Using Altera FPGA*, (Jan. 26, 2001) <http://csrc.nist.gov/CryptoToolkit/aes/roun2/conf3/papers/24-vfischer.pdf> (Micronic—Kosice, Slovakia).

Máire McLoone and J.V. McCanny, *High Performance Single-Chip FPGA Rijndael Algorithm Implementations*, CHES 2001 Proc, LNCS 2162, 65-76 (C.K. Koç et al. eds. May 16, 2001).

elixent, *Changing the Electronic Landscape* (2001) <http://www.elixent.com> (elixent—Bristol, UK).

elixent Application Note *JPEG Codec* (Dec. 9, 2002) <http://www.elixent.com/assets/jpeg-coder.pdf>(elixent—Bristol, UK).

U.S. Appl. No. 10/440,330, filed May 16, 2003, Stein et al.

U.S. Appl. No. 10/395,620, filed Mar. 24, 2003, Stein et al.

V. Baumgarte et al., *PACT XPP—A Self-Reconfigurable Data Processing Architecture* (Jun. 2001) <http://www.pactcorp.com/xneu/download/ersa01.pdf> (PACT XPP—Santa Clara, CA).

PACT Informationstechnologie GmbH, *The XPP White Paper Release 2.1* (Mar. 27, 2002) <http://www.pactcorp.com/xneu/download/xpp_white_paper.pdf> (PACT XPP—Santa Clara, CA).

* cited by examiner

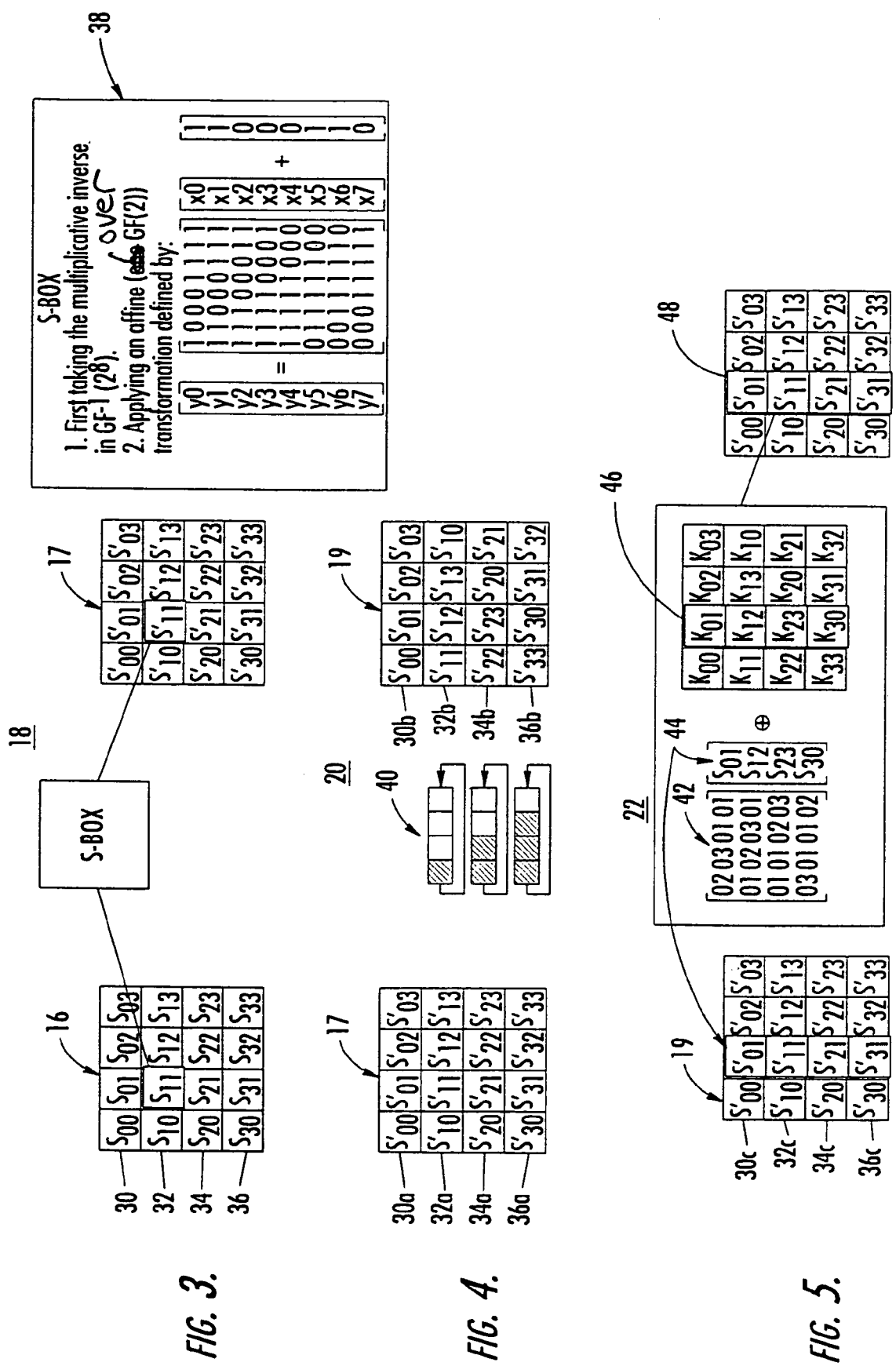

PROGRAMMABLE DATA ENCRYPTION ENGINE FOR ADVANCED ENCRYPTION STANDARD ALGORITHM

RELATED APPLICATIONS

This application claims priority of U.S. Provisional Application Ser. No. 60/341,634, filed Dec. 18, 2001.

FIELD OF THE INVENTION

This invention relates to a programmable data encryption engine for performing the cipher function of an advanced encryption standard (AES).

BACKGROUND OF THE INVENTION

An encryption engine for performing the American National Standard Institute (ANSI) advanced encryption standard (AES) enciphers and deciphers blocks of data, typically 128 bits (block size) using a variable length key up to 256 bits. Deciphering is accomplished using the same key that was used for encrypting but with the schedule of addressing the key bits altered so that the deciphering is the reverse of the encryption process.

There are a number of different algorithms for implementing AES; one of the more prominent ones is the Rijndael algorithm. Typically, that algorithm receives four, four byte, thirty-two bit words upon which it performs a subbytes transformation which includes a multiplicative inverse in a Galois field $GF^{-1}(2^8)$ and applying an affine (over GF(2)) transformation. Next a shift rows transformation is effected followed by a mix columns transformation which applies a mix column transformation and adds a round key.

This series of steps is repeated a number of times. The number of iterations depends on the key length and block size in accordance with the Rijndael algorithm. For example, for a key length of four, thirty-two bit words (128 bits) and a block size of four, thirty-two bit words the number of iterations is ten; for a key length of six (192 bits) and block size of four the number of iterations is twelve and for a key length of eight (256 bits) and block size of four the number of iterations is fourteen, where key length is the number of thirty-two bit words in the key and block size is the number of thirty-two bit words to be enciphered at a time. Thus, for example, with a key length of four and block size of four calling for ten iterations or rounds, ten round keys of four, thirty-two bit words each needs to be generated from an input master key of four, thirty-two bit words, one for each iteration or round. These are generated as forty different subkeys through one or two steps depending upon the key length and number of rounds. The first word in the generation of a round key undergoes (a) a word rotation, followed by the subword, a combination of inverse Galois field and affine transformation, and a Rcon[i] (an iteration dependent value) is added over the $GF(2^8)$ field; (b) a thirty-two bit word permutation exclusive Or-ed with the result of (a). For example, with ten rounds and a key length of four, every fourth subkey generation cycle undergoes both (a) and (b) steps. The other key generation cycles undergo only, (c) a thirty-two bit word permutation exclusive Or-ed with the previous subkey. Thus cycles 0, 4, 8, 12, 16, 20, 24, 28, 32, 36, 40 employ both (a), (b) steps, the remaining cycles use only (c) step. Typically, this requires 90 or more clock cycles for each word or 360 clock cycles for each block consisting of four words, and 3600 clock cycles for completing a Rijndael algorithm for AES. Thus, for a 10 megabit data stream operating on the four, thirty-two bit word block of one hundred and twenty-eight bits the requirement is for 281 Mega Instructions Per Second (MIPS).

SUMMARY OF THE INVENTION

It is therefore an object of this invention to provide an improved programmable data encryption engine for performing the cipher function of an advanced encryption standard (AES).

It is a further object of this invention to provide such an improved programmable data encryption engine for performing the cipher function of an advanced encryption standard (AES) using the Rijndael algorithm.

It is a further object of this invention to provide such an improved programmable data encryption engine for performing the cipher function of the advanced encryption standard (AES) implementable in software.

It is a further object of this invention to provide such an improved programmable data encryption engine for performing the cipher function of the advanced encryption standard (AES) which is much faster by an order of magnitude.

It is a further object of this invention to provide such an improved programmable data encryption engine for performing the cipher function of the advanced encryption standard (AES) which is extremely flexible and can be re-programmed for many different permutations and applications.

This invention features a programmable data encryption engine for performing the cipher function of an advanced encryption standard (AES) algorithm including a first parallel look-up table responsive to a first data block for implementing an AES selection function and executing the multiplicative inverse in $GF^{-1}(2^8)$ and applying an affine over GF(2) transformation to obtain the subbyte transformation. A second parallel look-up table transforms a subbyte transformation to obtain a shift row transformation. A Galois field multiplier transforms the shift row transformation to obtain a mix column transformation and adds a round key resulting in an advanced encryption standard cipher function of the first data block.

In a preferred embodiment there may be a key generator for providing a plurality of round keys to the Galois field multiplier. The key generator may include a key generator circuit responsive to a master key to generate the round keys. The key generator circuit may include a third parallel look-up table for rotating the master key to obtain a rotated subkey. The key generator circuit may include a fourth parallel look-up table for executing a multiplicative inverse in $GF^{-1}(2^8)$ and applying affine over GF(2) transformation to obtain the round keys. The first and second parallel look-up tables and the first Galois field multiplier may perform a number of rounds of transformations and there may a round key generated for each round. Each round key may include a plurality of subkeys. The Galois field multiplier may include a multiplier circuit for multiplying two polynomials with coefficients over a Galois field to obtain their product, a Galois field linear transformer circuit responsive to the multiplier circuit for predicting the modulo remainder of the polynomial for an irreducible polynomial, a storage circuit for supplying to the Galois field linear transformer circuit a set of coefficients for predicting the modulo remainder for a predetermined irreducible polynomial and a Galois field adder circuit for adding the product of the multiplier circuit with a third polynomial with coefficients over a Galois field for performing the multiplication and add operations in a single cycle. The parallel look-up table system may include a memory, a plurality of look-up tables stored in the memory, a row index register for holding the values to be looked up in the look-up tables, a column index register for storing a value representing the starting address of each look-up table stored in the memory, and an address translation circuit responsive to the column index register and the row index register to simultaneously generate an address for each value in the row index register to locate in parallel the functions of those values in each look-up table.

This invention also features a programmable data encryption engine for performing the cipher function of an advanced encryption standard (AES) algorithm. There is a parallel look-up table system responsive in a first mode to a first data block for implementing an AES selection function and executing the multiplicative inverse in $GF^{-1}(2^8)$ and applying an affine over $GF(2)$ transformation to obtain a subbyte transformation and in the second mode to the subbyte transformation to transform the subbyte transformation to obtain a shift row transformation. A Galois field multiplier transforms the shift row transformation to obtain a mix column transformation and adds a round key resulting in an advanced encryption standard cipher function of the first data block. In a preferred embodiment, the parallel look-up table system may be responsive to a master key in a third mode to obtain a subkey and may be responsive to the subkey in a fourth mode to generate a round key.

BRIEF DESCRIPTION OF THE DRAWINGS

Other objects, features and advantages will occur to those skilled in the art from the following description of a preferred embodiment and the accompanying drawings, in which:

FIG. 3 is a schematic block diagram showing the subbyte transformation of the AES cipher algorithm of FIG. 2;

FIG. 4 is a schematic block diagram showing the shift row transformation of the AES cipher algorithm of FIG. 2;

FIG. 5 is a schematic block diagram showing the mix column transformation and addition of a round key in accordance with the AES cipher algorithm of FIG. 2;

DISCLOSURE OF THE PREFERRED EMBODIMENT

Figure 1:
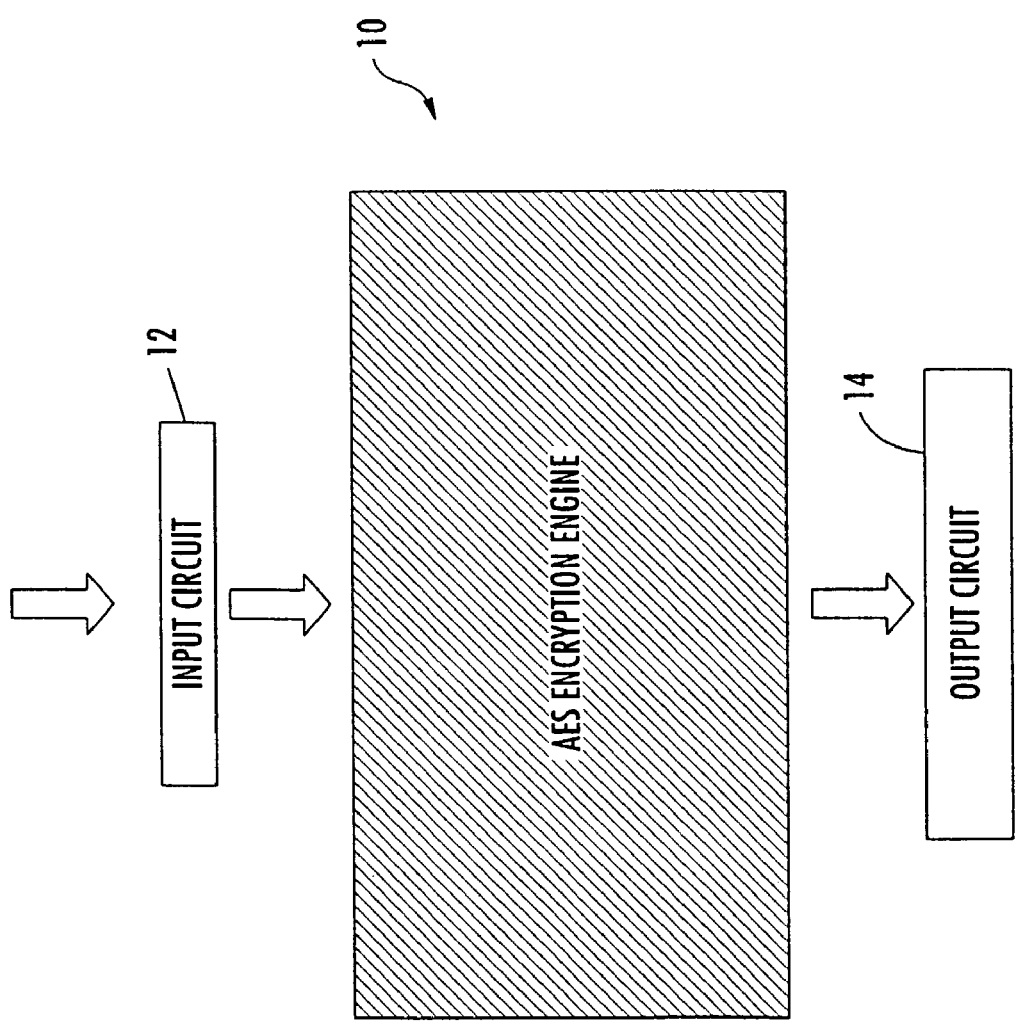
FIG. 1 is a block diagram of an advanced encryption standard (AES) encryption engine according to this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 2:
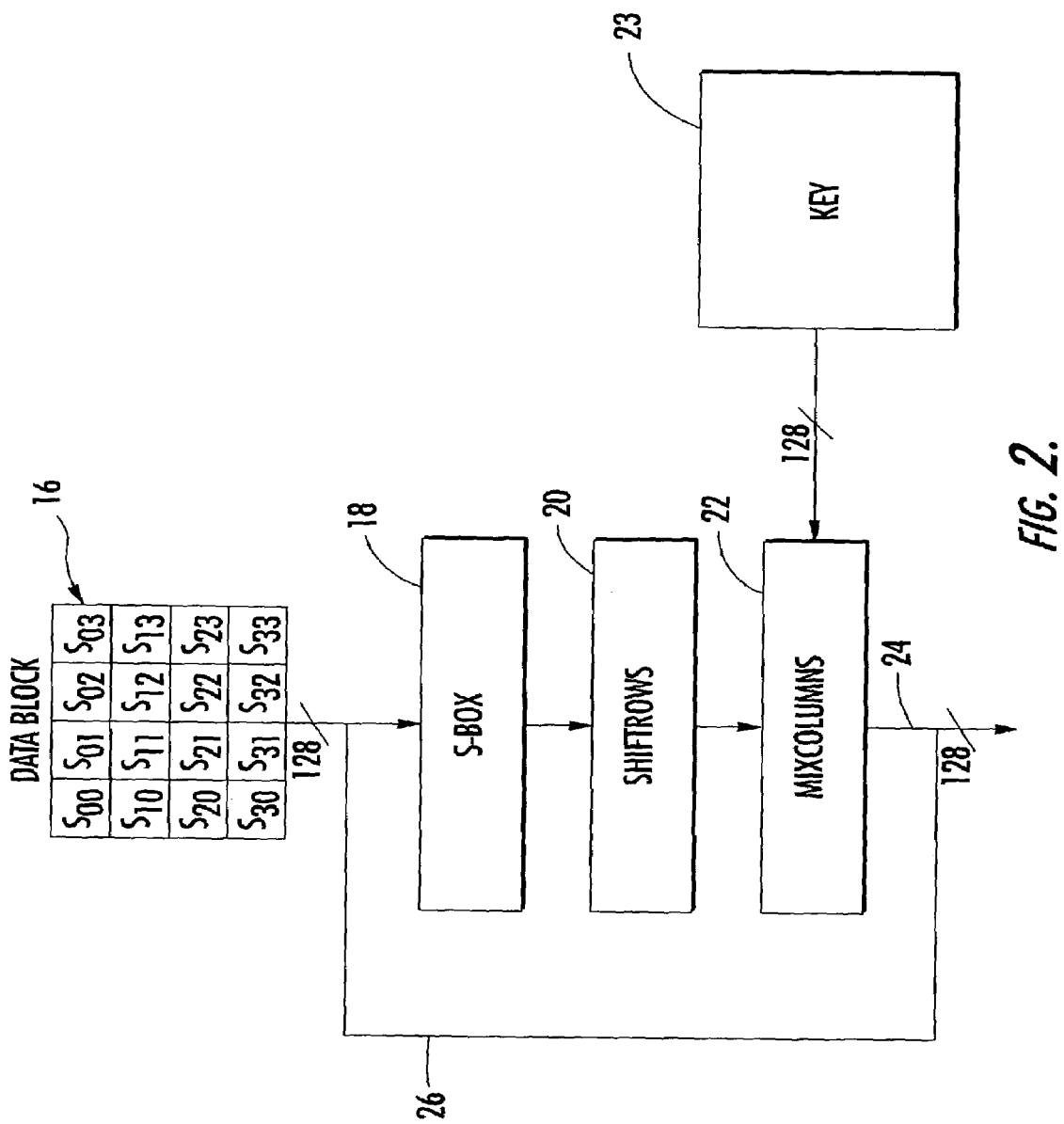
FIG. 2 is schematic block diagram showing the basic AES cipher algorithm.

There is shown in FIG. 1 an AES encryption engine 10 according to this invention with an associated input circuit 12 and output circuit 14. The advanced encryption standard (AES) algorithm performed by AES encryption engine 10 is illustrated in FIG. 2, where incoming data block 16 first undergoes an SBOX transformation 18 then a shift row transformation 20 followed by a mix column transformation 22 in which key 23 is added. The output at 24 is fed back over line 26 a number of times, the number depending upon the particular AES algorithm chosen. For example, in Chart I below:

CHART I

|  | Key Length (Nk words) | Block Size (Nb words) | Number of Rounds (Nr) |
| --- | --- | --- | --- |
| AES-128 | 4 | 4 | 10 |
| AES-192 | 6 | 6 | 12 |
| AES-256 | 8 | 8 | 14 | for the algorithm AES-128 the key length is four, the block size is four and the number of rounds or iterations is 10, whereas for AES-192, where the key length is six and block size is six, the number of iterations is 12 and for AES-256 the number of iterations is 14. Each time a round is executed a new key is introduced. The AES algorithm subbyte transformation is effected using an S-BOX wherein the data block 16 is comprised of four words 30, 32, 34, 36 each of four bytes, $S_{00}$-$S_{03}$, $S_{10}$-$S_{13}$, $S_{20}$-$S_{23}$, and $S_{30}$-$S_{33}$. The S-Box transformation first takes the multiplicative inverse in $GF^{-1}(2^8)$ and then applies an affine over $GF(2)$ transformation defined by the matrix expression as shown in box 38, FIG. 3. The output is the subbyte transformation 17 of data block 16. The subbyte transformation 17, FIG. 4 then undergoes a shift row transformation in which the first row 30*a*, is not rotated at all, the second row 32*a* is rotated one byte, the third row 34*a* is rotated two bytes, and the fourth row 36*a* is rotated three bytes. The shifting is depicted by the schematic 40 and results in the shift row transformed data block 19 wherein the same values appear but shifted one, two, and three places in rows 32*b*, 34*b*, and 36*b*. In the mix column transformation and addition of the round key, FIG. 5, data block 19 is then multiplied a column at a time by the mix column transformation matrix 42. In this example the second column 44 is shown being multiplied by the mixed column transformation matrix. To this is added the round key in this case column 46, to obtain the completed advanced encryption standard cipher function 48 of the first data block 16.

Figure 6:
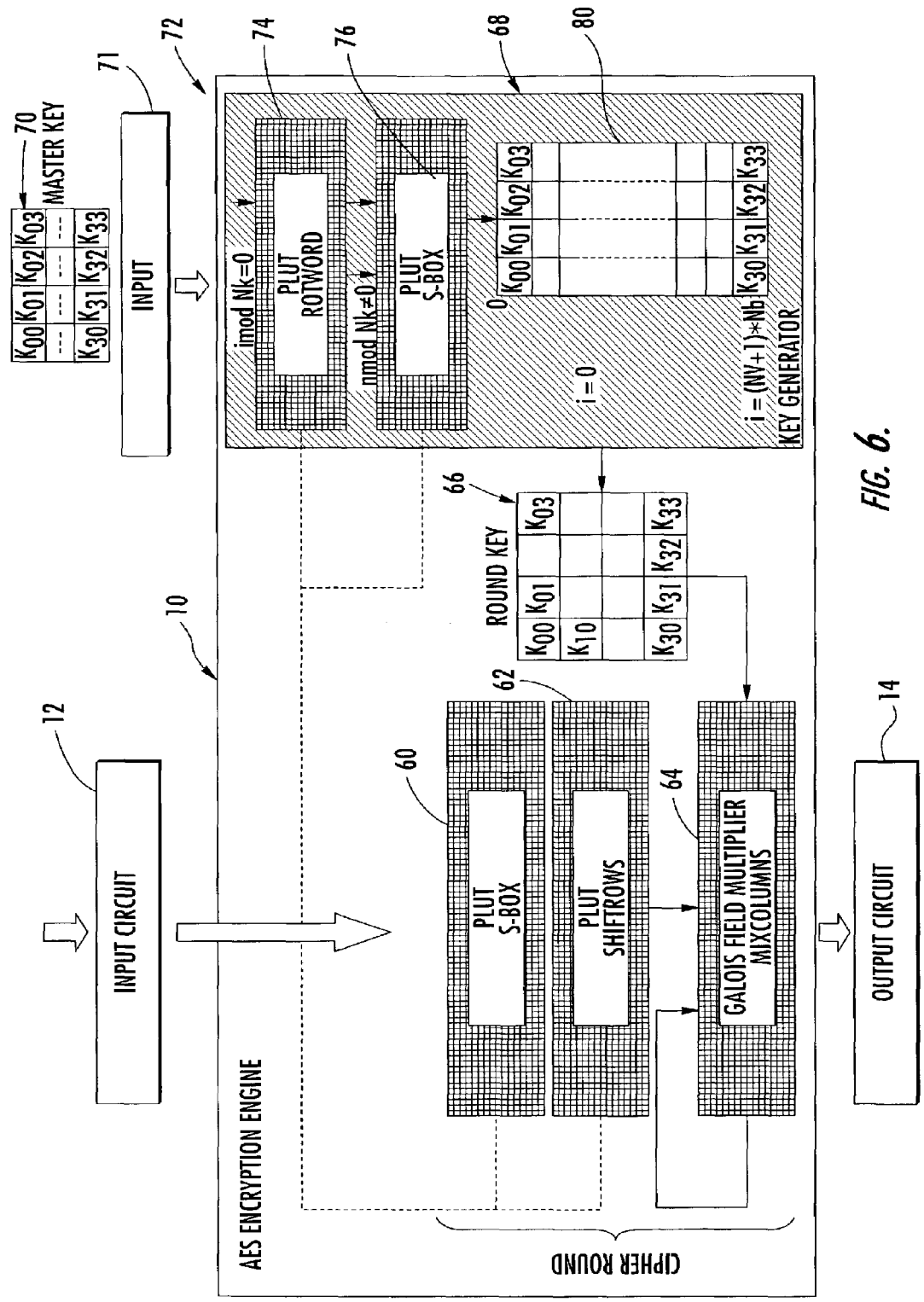
FIG. 6 is a more detailed schematic block diagram of the AES encryption engine of FIG. 1 according to this invention.

In one embodiment, according to this invention, AES encryption engine 10 may include a parallel look-up table 60, FIG. 6, for performing the S-BOX transformation, a parallel look-up table 62 for performing the shift row transformation, and a Galois field multiplier 64 for performing the mix column and key addition operation. Each iteration a different key or round key is provided. For example, in an ABS 128 algorithm implementation there will be ten rounds, each round will be supplied with a key. Each iteration a different round key 66 is introduced. The round keys are generated by the key generator 68 from a master key 70 introduced through input 71, by means of key generator circuit 72 which includes a rotation word parallel look-up table 74 and an S-BOX BOX parallel look-up table 76. The rotation word parallel look-up table 74 simply takes a word ($a_0$, $a_1$, $a_2$, $a_3$) as input and performs a cyclical permutation and returns the word as ($a_1$, $a_2$, $a_3$, $a_0$). The S-BOX parallel look-up table 76 performs an S-BOX function similar to S-BOX function 18, FIG. 2 as depicted in more detail in FIG. 3. Once the keys or subkeys are generated and stored as at key storage 80 in FIG. 6, they are used a round key at a time for each iteration or round performed, where a round key includes four words of four 8-bit bytes each.

Figure 7:
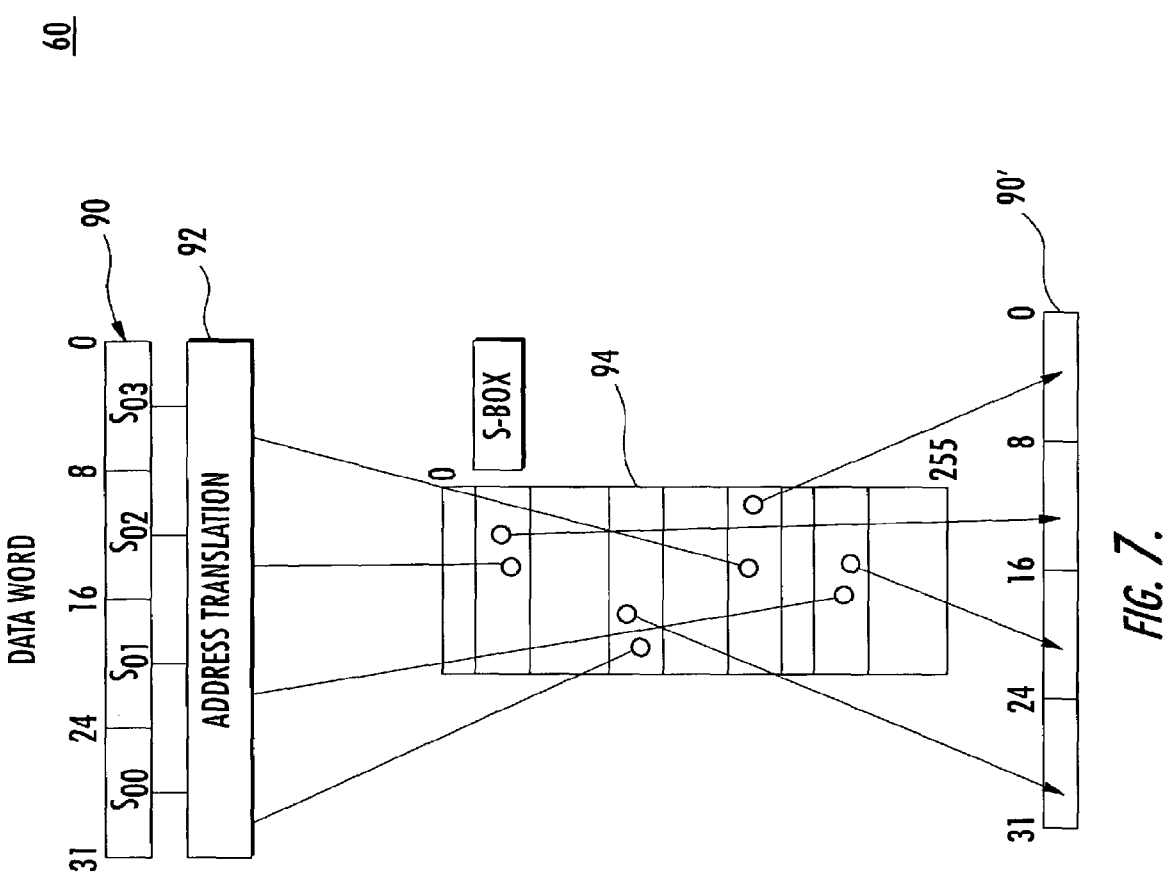
FIG. 7 is a more detailed schematic block diagram of the SBOX parallel look-up table of FIG. 6.

The S-BOX parallel look-up table 60 operates as shown in FIG. 7 where a data word 90 consisting of four 8-bit bytes is submitted to an address translation circuit 92, which addresses specific addresses in the memory 94 which are then read out in some correlated relationship to produce the data word 90' pursuant to the subbyte transformation resulting in data block 17, FIG. 3. Shift row parallel look-up table 62, performs the byte rotation as depicted in FIG. 4 by applying the data word 100, FIG. 8, through an address translation circuit 102 to address specific sites in memory 104 which are then read out correlated to produce the rotated byte configuration 106 as depicted in FIG. 4.

Figure 8:
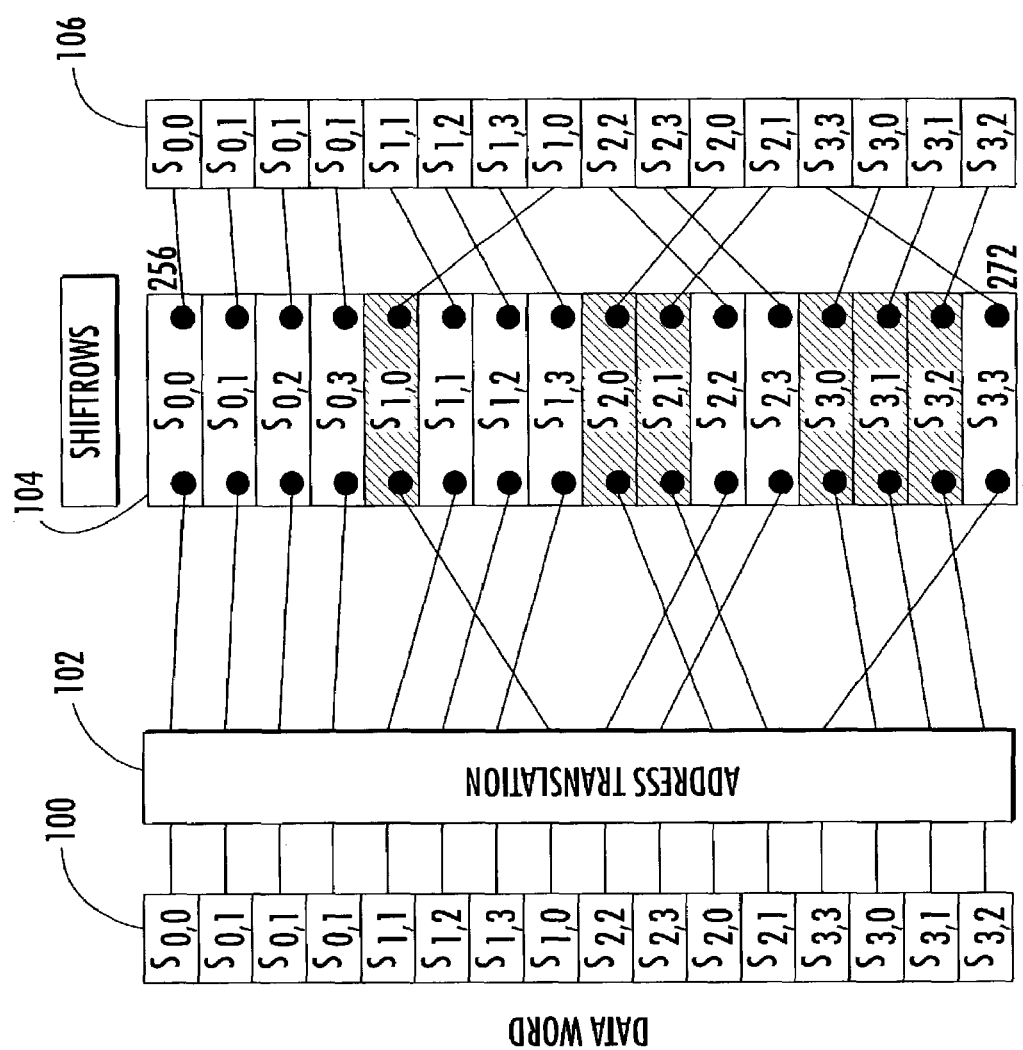
FIG. 8 is a more detailed schematic block diagram of the shift row parallel look-up table of FIG. 6.
Figure 9:
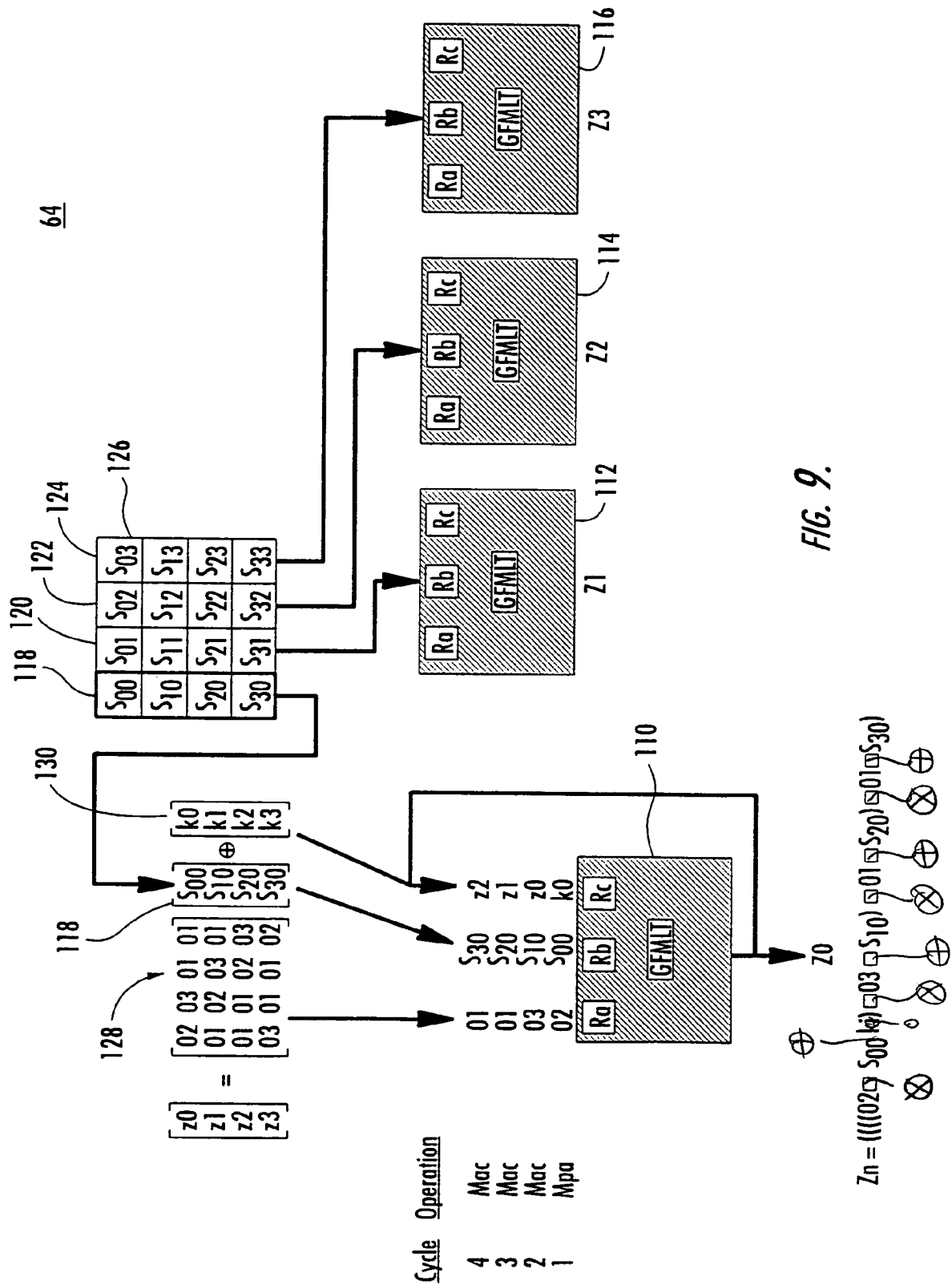
FIG. 9 is a more detailed schematic block diagram of the mix column Galois field multiplier of FIG. 6.
Figure 10:
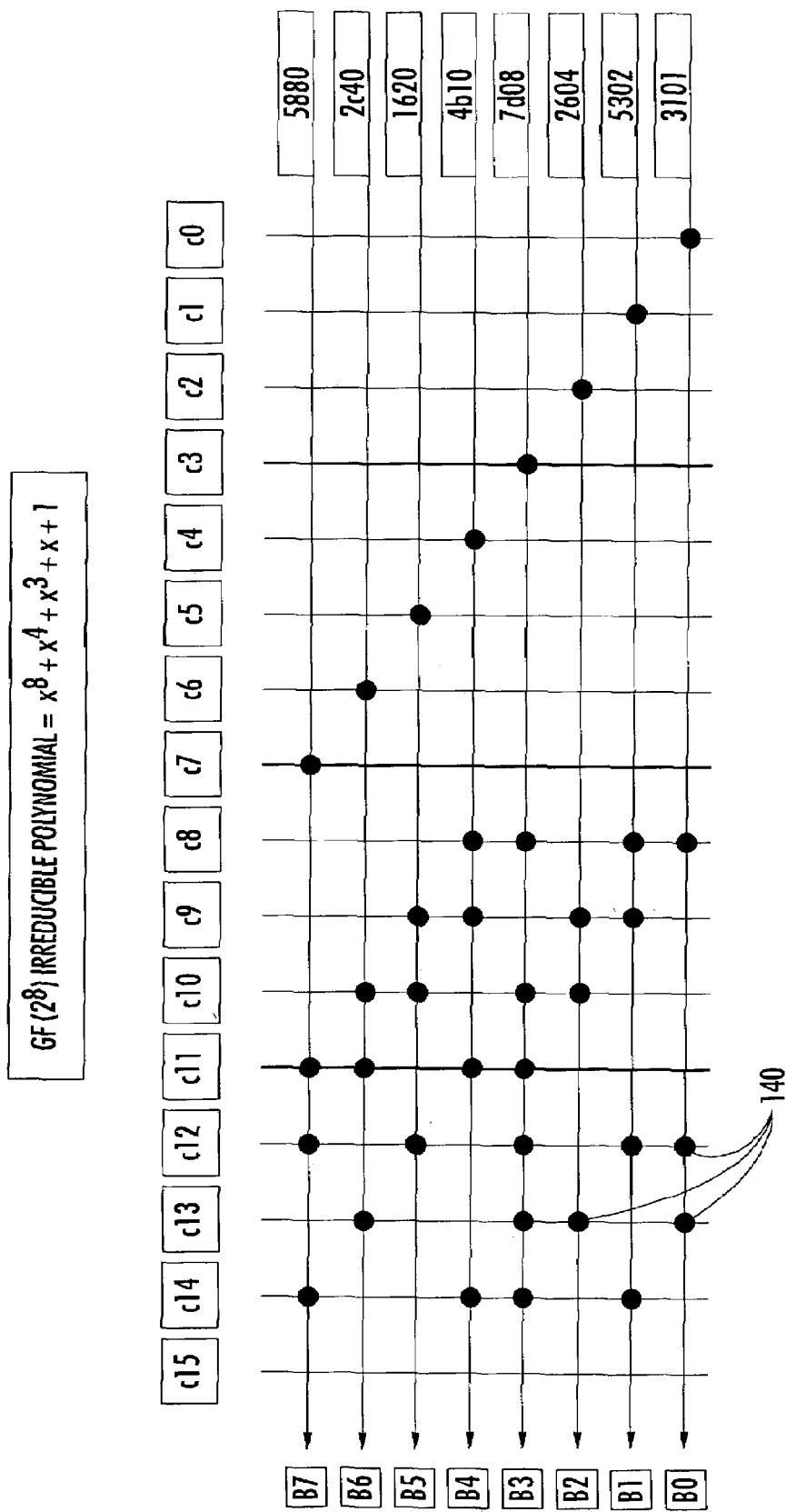
FIG. 10 is a schematic diagram showing the programming of the Galois field transformer to effect the mix column function of the AES algorithm.

Mix column Galois field multiplier 64 may be implemented using four Galois field multiplier linear transformers 110, 112, 114, and 116, FIG. 9, so that each one processes a column 118, 120, 122, 124 of data block 126 so that the entire data block can be processed at once. Each Galois field multiplier linear transformer 110-116, includes three registers, $R_A$, $R_B$, $R_C$, all four operate the same so the discussion of Galois field linear transformer 110 will suffice to explain the operation of all four. Galois field multiplier linear transformer 110 is shown operating over four cycles, identified as cycles 1, 2, 3, and 4. In cycle 1 a multiply and add operation is accomplished whereas in cycles 2, 3, and 4, multiply accumulation operations occur. Register $R_A$ receives mix column transformation matrix 128. Register $R_B$ receives the bytes in column 118 and register $R_C$ receives the keys 130, $K_0$-$K_3$. In the first cycle the value in the first position in matrix 128 is multiplied by the value of $S_{00}$ in column 118 and the key $K_0$ is added to it to form the output $Z_0$. In the next cycle the next value 03 from matrix 128 is multiplied by the next value $S_{10}$ in column 118 and added to it now is the output $Z_0$ to complete the multiply accumulate operation. The next two cycles perform similar operations with the next two values in the matrix and the next two values in the column. The final output is shown as $$Z_N = (((02 \otimes S_{00} \oplus k_0) \otimes 03 \oplus S_{10}) \otimes 01 \oplus S_{20}) \otimes 01 \oplus S_{30}$$

Where $\oplus$=Galois field add and $\otimes$=Galois field multiplication transformation. Each of the Galois field multiplication linear transformers 110-116 is programmed as shown in FIG. 10 where circles 140 indicate connections to enabled exclusive OR gates. This programming effects the AES Galois field $GF^{-1}(2^8)$ irreducible polynomial ($x^8+x^4+x^3+x+1$). Rotation word parallel look-up table 74, FIG. 6, may be implemented in a similar fashion to shift row parallel look-up table 62 as shown in FIG. 8. And S-BOX parallel look-up table 76, FIG. 6, in key generator 68 may be implemented as S-BOX parallel look-up table 60 shown in FIG. 7.

Figure 11:
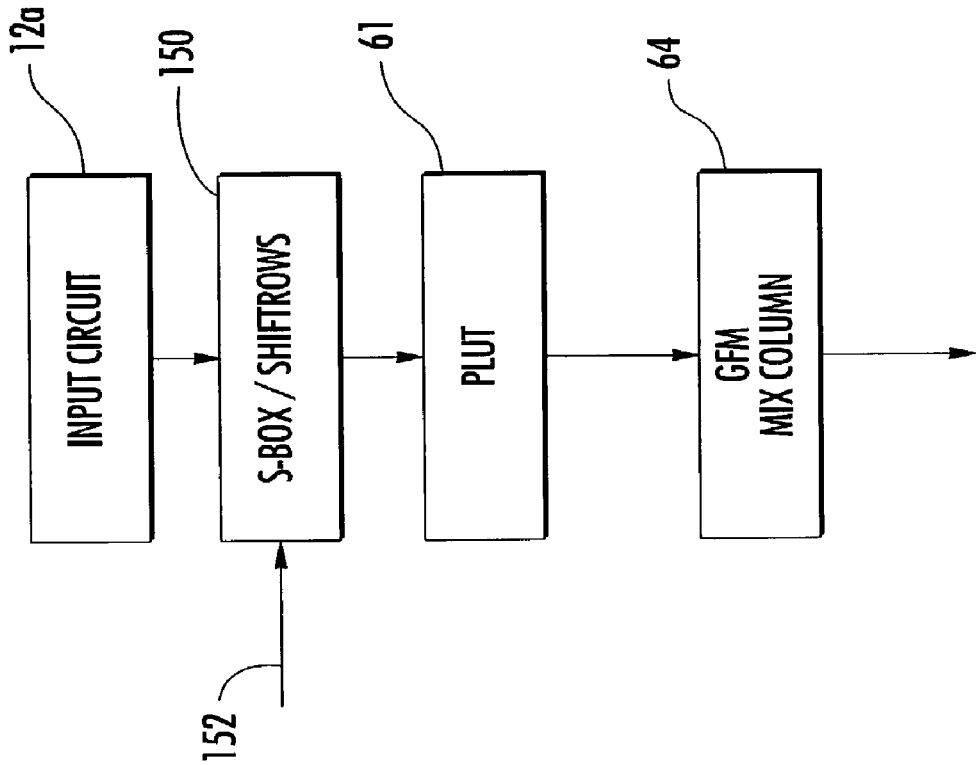
FIG. 11 is a schematic block diagram of an AES encryption engine according to this invention in which a single parallel look-up table is used to perform the cipher S-BOX and shift row operations.
Figure 12:
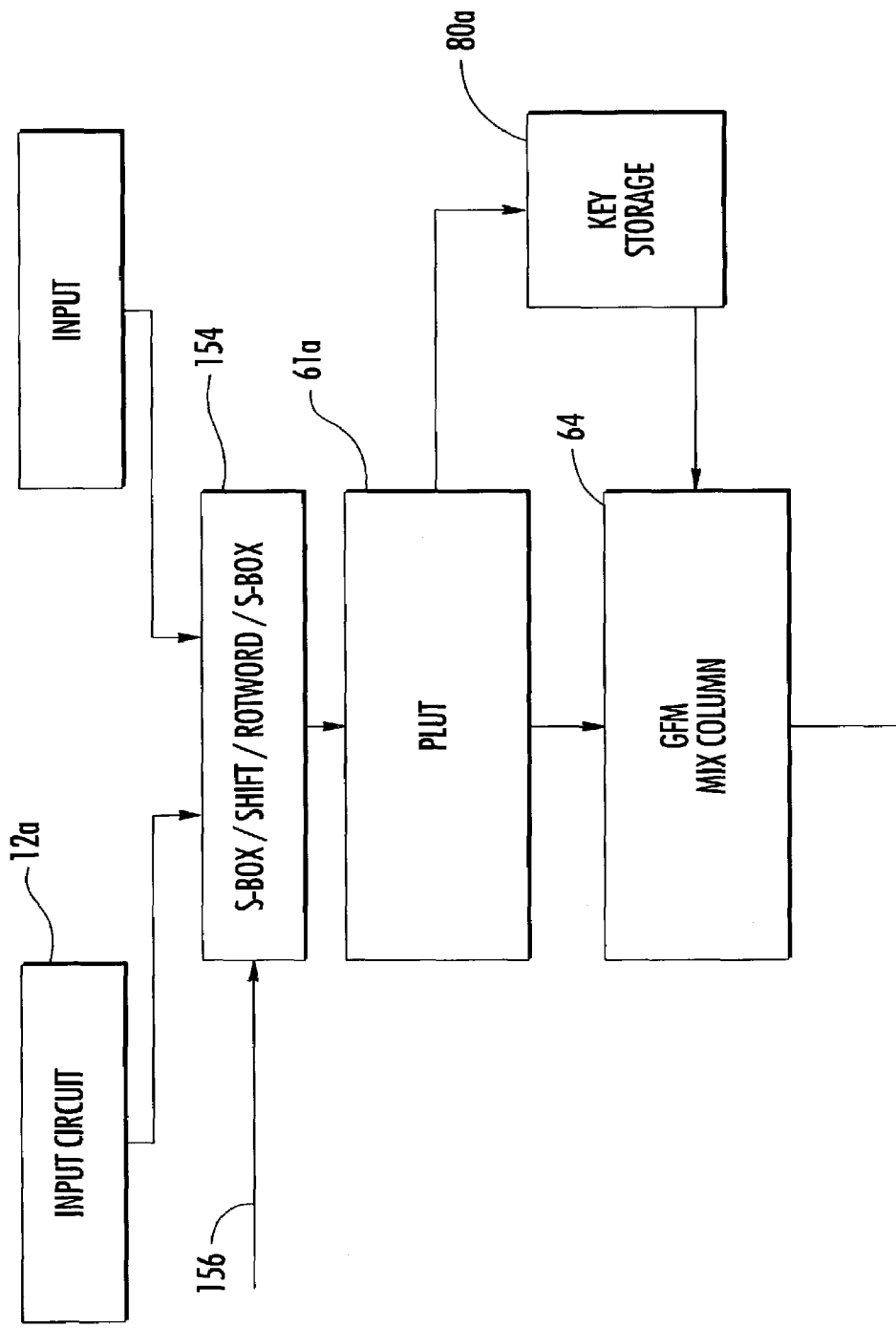
FIG. 12 is a schematic block diagram of an AES encryption engine according to this invention in which a single parallel look-up table is used to perform the cipher S-BOX and shift row operations as well as the rotation word and S-BOX operations for round key generation.

Although thus far the embodiments shown uses two separate parallel look-up tables to perform the S-BOX and shift row operations in the AES encryption engine and uses third and fourth parallel look-up tables to do the rotation word and S-BOX operations in the round key generation, this is not a necessary limitation of the invention. For example, as shown in FIG. 11 input circuit 12a may be interconnected with a single parallel look-up table 61 via a configuration control circuit 150 which, upon an instruction, on line 152 can configure parallel look-up table 61 either for an S-BOX operation or a shift row operation. Since these operations occur at different times the same parallel look-up table may do double duty performing each function but at a different time with a consequent savings in hardware. In addition, parallel look-up table 61a, FIG. 12 may be employed in four different modes, S-BOX and shift row for the cipher round, and rotation word and S-BOX for the key generation under control of configuration circuit 154. Thus, configuration circuit 154 in response to an instruction on line 156 can configure parallel look-up table 61a to perform either the cipher S-BOX, cipher shift row, key rotation word, or key S-BOX operations. In the first and second modes where cipher operation occurs, the output from parallel look-up table 61a will go directly to the Galois field multiplier 64. In the third and fourth modes, where the key generation, rotation word, and S-BOX functions are performed the output from the parallel look-up table 61a would be delivered to key storage 80a where it can be accessed by Galois field multiplier 64. Although FIG. 12 uses a mode switch circuit 154, which includes an actual logic circuit, this is not a necessary limitation of the invention. The invention can be simplified realizing that the four parallel look-up tables (PLUTs) can be treated as one 272-byte linear parallel look-up table (PLUT). Where a 256 byte S-Box PLUT can be shared by the cipher and the round key generator. And the ShiftRow and WordShift transforms, which are two memory-less byte rotation operations, can share the same 16-byte look-up table. The exact address in the parallel look-up table is found by adding a starting address to the value to be looked up. Therefore the mode switch circuit can be simply implemented as two parallel look-up table starting address. The operation of the parallel look-up table is explained more fully in U.S. patent application entitled RECONFIGURABLE PARALLEL LOOK-UP TABLE SYSTEM, Stein et al., filed Apr. 24, 2002 (AD-305J).

Figure 13:
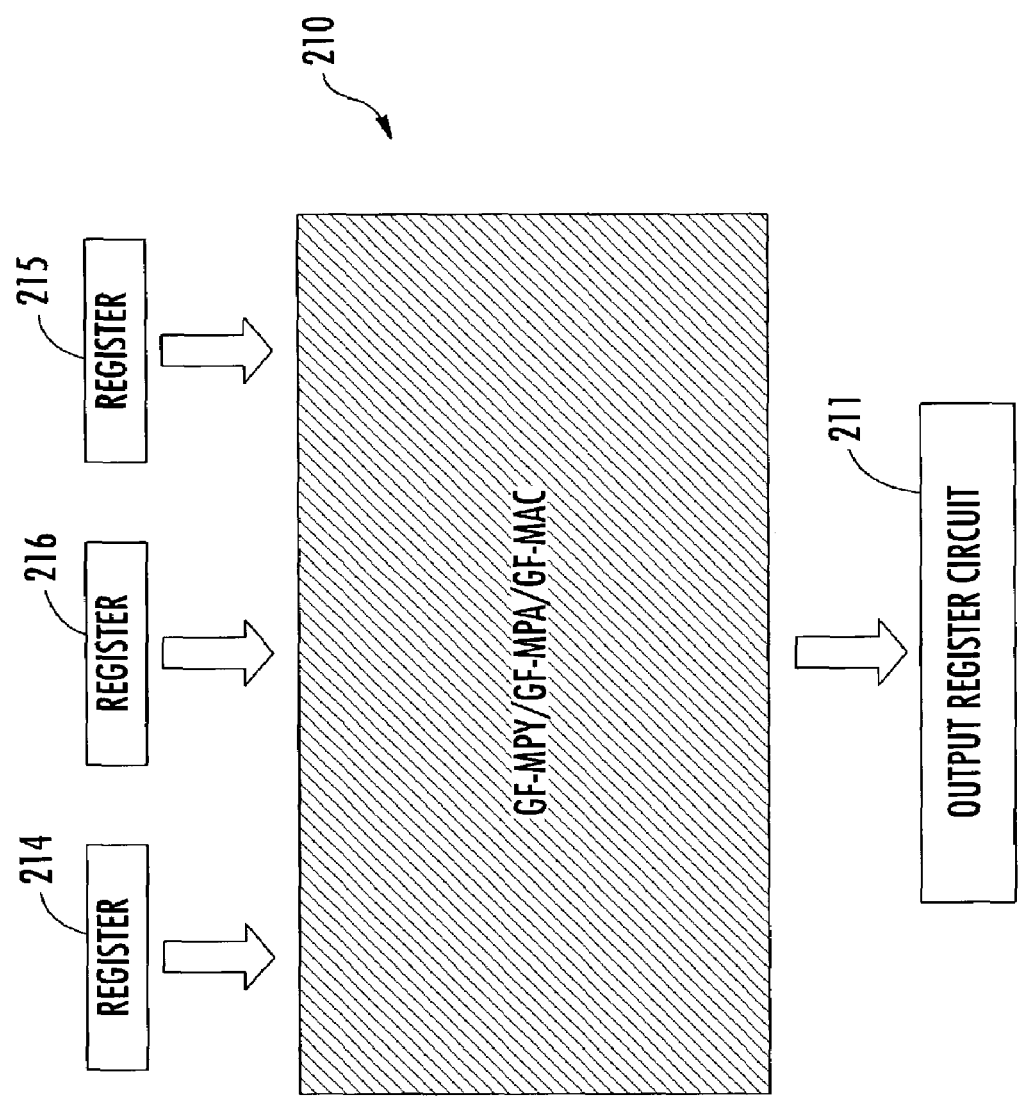
FIG. 13 is a simplified block diagram of a Galois field multiply/multiply-add/multiply-accumulate system which can be used to implement this invention.

There is shown in FIG. 13 a Galois field multiply/multiply-add/multiply-accumulate system 210 which can selectively multiply the values in registers 214 and 216 and provide their product to output register 211 or multiply the values in registers 14 and 16 and sum their product with the values in register 215 and provide that result to output register 211 in implementation of this invention.

Figure 14:
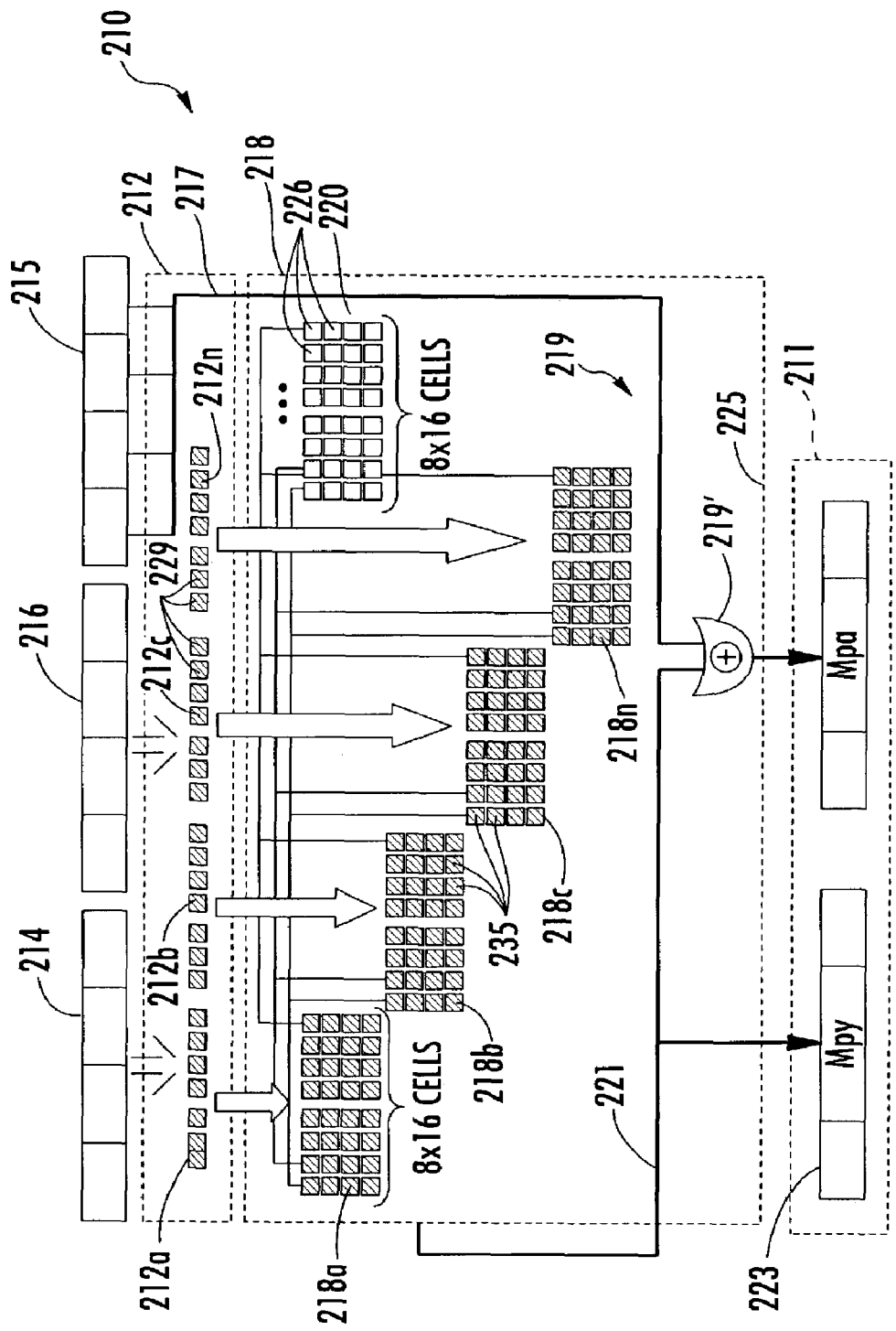
FIG. 14 is a more detailed view of the Galois field multiply/multiply-add/multiply-accumulate system of FIG. 13.

Before explanation of the more detailed embodiment in FIG. 14 of system 210 in FIG. 13, a brief discussion of the properties and operations of Galois field multiplication and addition follows.

A Galois field GF(n) is a set of elements on which two binary operations can be performed. Addition and multiplication must satisfy the commutative, associative and distributive laws. A field with a finite number of elements is a finite field. An example of a binary field is the set {0,1} under modulo 2 addition and modulo 2 multiplication and is denoted GF(2). The modulo 2 addition and multiplication operations are defined by the tables shown in the following figure. The first row and the first column indicate the inputs to the Galois field adder and multiplier. For e.g. 1+1=0 and 1*1=1.

| Modulo 2 Addition (XOR) | | |
| --- | --- | --- |
| + | 0 | 1 |
| 0 | 0 | 1 |
| 1 | 1 | 0 |

| Modulo 2 Multiplication (AND) | | |
| --- | --- | --- |
| * | 0 | 1 |
| 0 | 0 | 0 |
| 1 | 0 | 1 |

In general, if p is any prime number then it can be shown that GF(p) is a finite field with p elements and that $GF(p^m)$ is an extension field with $p^m$ elements. In addition, the various elements of the field can be generated as various powers of one field element, $\alpha$, by raising it to different powers. For example GF(256) has 256 elements which can all be generated by raising the primitive element, $\alpha$, to the 256 different powers.

In addition, polynomials whose coefficients are binary belong to GF(2). A polynomial over GF(2) of degree m is said to be irreducible if it is not divisible by any polynomial over GF(2) of degree less than m but greater than zero. The polynomial $F(X)=X^2+X+1$ is an irreducible polynomial as it is not divisible by either X or X+1. An irreducible polynomial of degree m which divides $X^{2^{m-1}}+1$, is known as a primitive polynomial. For a given m, there may be more than one primitive polynomial. An example of a primitive polynomial for m=8, which is often used in most communication standards is $F(X)=X^8+X^4+X^3+X^2+X+1$.

Galois field addition is easy to implement in software, as it is the same as modulo addition. For example, if 29 and 16 are two elements in $GF(2^8)$ then their addition is done simply as an XOR operation as follows: 29 (11101)⊕16(10000)=13 (01101).

Galois field multiplication on the other hand is a bit more complicated as shown by the following example, which computes all the elements of $GF(2^4)$, by repeated multiplication of the primitive element $\alpha$. To generate the field elements for $GF(2^4)$ a primitive polynomial G(x) of degree m=4 is chosen as follows $G(x)=X^4+X+1$. In order to make the multiplication be modulo so that the results of the multiplication are still elements of the field, any element that has the fifth bit set is brought into a 4-bit result using the following identity $F(\alpha)=\alpha^4+\alpha+1=0$. This identity is used repeatedly to form the different elements of the field, by setting $\alpha^4=1+\alpha$. Thus the elements of the field can be enumerated as follows:

$$\{0, 1, \alpha, \alpha^2, \alpha^3, 1+\alpha, \alpha+\alpha^2, \alpha^2+\alpha^3, 1+\alpha+\alpha^3, \ldots 1+\alpha^3\}$$

since $\alpha$ is the primitive element for $GF(2^4)$ it can be set to 2 to generate the field elements of $GF(2^4)$ as $\{0, 1, 2, 4, 8, 3, 6, 12, 11 \ldots 9\}$.

It can be seen that Galois field polynomial multiplication can be implemented in two basic steps. The first is a calculation of the polynomial product $c(x)=a(x)*b(x)$ which is algebraically expanded, and like powers are collected (addition corresponds to an XOR operation between the corresponding terms) to give c(x).

For example $c(x)=(a_3x^3+a_2x^2+a_1x^1+a_0)*(b_3x^3+b_2x^3+b_1x^1+b_0)$ $C(x)=c_6x^6+c_5x^5+c_4x^4+c_3+c_2x^2+c_1x^1+c_0$ where:

CHART II $c_0 = a_0 * b_0$
$c_1 = a_1 * b_0 \oplus a_0 * b_1$
$c_2 = a_2 * b_0 \oplus a_1 * b_1 \oplus a_0 * b_2$
$c_3 = a_3 * b_0 \oplus a_2 * b_1 \oplus a_1 * b_2 \oplus a_0 * b_3$
$c_4 = a_3 * b_1 \oplus a_2 * b_2 \oplus a_1 * b_3$
$c_5 = a_3 * b_2 \oplus a_2 * b_3$
$c_6 = a_3 * b_3$ The second is the calculation of $d(x)=c(x)$ modulo $p(x)$ where $p(x)$ is an irreducible polynomial.

To illustrate, multiplications are performed with the multiplication of polynomials modulo an irreducible polynomial. For example: (if $p(x)=x^8+x^4+x^3+x+1$)

$\{57\}*\{83\}=\{c1\}$ because,

Each of these $\{*\}$ bytes is the concatenation of its individual bit values (0 or 1) in the order $\{b7, b6, b5, b4, b3, b2, b1, b0\}$ and are interpreted as finite elements using polynomial representation:

$$b_7x^7+b_6x^6+b_5x^5+b_4x^4+b_3x^3+b_2x^2+b_1x^1+b_0x^0=\Sigma b_ix^i$$

First Step $$(x^6 + x^4 + x^2x + 1)(x^7 + x + 1) = x^{13} \oplus x^{11} \oplus x^9 \oplus x^8 \oplus x^7$$
$$x^7 \oplus x^5 \oplus x^3 \oplus x^2 \oplus x$$
$$x^6 \oplus x^4 \oplus x^2 \oplus x \oplus x$$
$$= x^{13} \oplus x^{11} \oplus x^9 \oplus x^8 \oplus x^6 \oplus$$
$$x^5 \oplus x^4 \oplus x^3 \oplus 1$$

Second Step $$x^{13} + x^{11} + x^9 + x^8 + x^6 + x^5x^4 +$$
$$x^3 + 1 \; \text{modulo}(x^8 + x^4 + x^3 + x + 1) = x^7 + x^6 + 1$$

An improved Galois field multiplier system includes a binary polynomial multiplier circuit for multiplying two binary polynomials to obtain their sixteen-term polynomial product c(x) as defined in chart III. The multiplier circuit actually includes a plurality of multiplier cells.

CHART III c14 = a7 * b7
c13 = a7 * b6 ⊕ a6 * b7
c12 = a7 * b5 ⊕ a6 * b6 ⊕ a5 * b7
c11 = a7 * b4 ⊕ a6 * b5 ⊕ a5 * b6 ⊕ a4 * b7
c10 = a7 * b3 ⊕ a6 * b4 ⊕ a5 * b5 ⊕ a4 * b6 ⊕ a3 * b7
c9 = a7 * b2 ⊕ a6 * b3 ⊕ a5 * b4 ⊕ a4 * b5 ⊕ a3 * b6 ⊕ a2 * b7
c8 = a7 * b1 ⊕ a6 * b2 ⊕ a5 * b3 ⊕ a4 * b4 ⊕ a3 * b5 ⊕ a2 * b6 ⊕ a1 * b7
c7 = a7 * b0 ⊕ a6 * b1 ⊕ a5 * b2 ⊕ a4 * b3 ⊕ a3 * b4 ⊕ a2 * b5 ⊕ a1 * b6 ⊕ a0 * b7
c6 = a6 * b0 ⊕ a5 * b1 ⊕ a4 * b2 ⊕ a3 * b3 ⊕ a2 * b4 ⊕ a1 * b5 ⊕ a0 * b6
c5 = a5 * b0 ⊕ a4 * b1 ⊕ a3 * b2 ⊕ a2 * b3 ⊕ a1 * b4 ⊕ a0 * b5;
c4 = a4 * b0 ⊕ a3 * b1 ⊕ a2 * b2 ⊕ a1 * b3 ⊕ a0 * b4
c3 = a3 * b0 ⊕ a2 * b1 ⊕ a1 * b2 ⊕ a0 * b3
c2 = a2 * b0 ⊕ a1 * b1 ⊕ a0 * b2
c1 = a1 * b0 ⊕ a0 * b1
c0 = a0 * b0

Each term includes an AND function as represented by an * and each pair of terms are combined with a logical exclusive OR as indicated by a ⊕. This product is submitted to a Galois field linear transformer circuit which may include a number of Galois field linear transformer units each composed of 16×8 cells, which respond to the product produced by the multiplier circuit to predict in one cycle the modulo remainder of the polynomial product for a predetermined irreducible polynomial. The multiplication is performed in the units. The construction and operation of this Galois field linear transformer circuit and each of its transformer units and its multiplier function is explained more fully in U.S. Pat. No. 6,587,864 B2, issued Jul. 1, 2003 and U.S. Provisional Patent Application Ser. No. 60/334,510, filed Nov. 30, 2001 each of which is incorporated herein in its entirety by this reference. Each of the Galois field linear transformer units predicts in one cycle the modulo remainder by dividing the polynomial product by an irreducible polynomial. That irreducible polynomial may be, for example, anyone of those shown in Chart IV.

CHART IV $GF(2^1)$

0x3 $(x + 1)$
$GF(2^2)$

0x7 $(x^2 + x + 1)$
$GF(2^3)$

0xB $(x^3 + x + 1)$
0xD $(x^3 + x^2 + 1)$
$GF(2^4)$

0x13 $(x^4 + x + 1)$
0x19 $(x^4 + x^3 + 1)$
$GF(2^5)$

0x25 $(x^5 + x^2 + 1)$
0x29 $(x^5 + x^3 + 1)$
0x2F $(x^5 + x^3 + x^2 + x + 1)$
0x37 $(x^5 + x^4 + x^2 + x + 1)$
0x3B $(x^5 + x^4 + x^3 + x + 1)$
0x3D $(x^5 + x^4 + x^3 + x^2 + 1)$
$GF(2^6)$

0x43 $(x^6 + x + 1)$
0x5B $(x^6 + x^4 + x^3 + x + 1)$
0x61 $(x^6 + x^5 + 1)$
0x67 $(x^6 + x^5 + x^2 + x + 1)$
0x6D $(x^6 + x^5 + x^3 + x^2 + 1)$
0x73 $(x^6 + x^5 + x^4 + x + 1)$
$GF(2^7)$

0x83 $(x^7 + x + 1)$
0x89 $(x^7 + x^3 + 1)$
0x8F $(x^7 + x^3 + x^2 + x + 1)$
0x91 $(x^7 + x^4 + 1)$
0x9D $(x^7 + x^4 + x^3 + x^2 + 1)$
0xA7 $(x^7 + x^5 + x^2 + x + 1)$
0xAB $(x^7 + x^5 + x^3 + x + 1)$
0xB9 $(x^7 + x^5 + x^4 + x^3 + 1)$
0xBF $(x^7 + x^5 + x^4 + x^3 + x^2 + x + 1)$
0xC1 $(x^7 + x^6 + 1)$
0xCB $(x^7 + x^6 + x^3 + x + 1)$
0xD3 $(x^7 + x^6 + x^4 + x + 1)$
0xE5 $(x^7 + x^6 + x^5 + x^2 + 1)$
0xF1 $(x^7 + x^6 + x^5 + x^4 + 1)$
0xF7 $(x^7 + x^6 + x^5 + x^4 + x^2 + x + 1)$
0xFD $(x^7 + x^6 + x^5 + x^4 + x^3 + x^2 + 1)$
$GF(2^8)$

0x11D $(x^8 + x^4 + x^3 + x^2 + 1)$
0x12B $(x^8 + x^5 + x^3 + x + 1)$
0x12D $(x^8 + x^5 + x^3 + x^2 + 1)$
0x14D $(x^8 + x^6 + x^3 + x^2 + 1)$

CHART IV-continued

0x15F $(x^8 + x^6 + x^4 + x^3 + x^2 + x + 1)$
0x163 $(x^8 + x^6 + x^5 + x + 1)$
0x165 $(x^8 + x^6 + x^5 + x^2 + 1)$
0x169 $(x^8 + x^6 + x^5 + x^3 + 1)$
0x171 $(x^8 + x^6 + x^5 + x^4 + 1)$
0x187 $(x^8 + x^7 + x^2 + x + 1)$
0x18D $(x^8 + x^7 + x^3 + x^2 + 1)$
0x1A9 $(x^8 + x^7 + x^5 + x^3 + 1)$
0x1C3 $(x^8 + x^7 + x^6 + x + 1)$
0x1CF $(x^8 + x^7 + x^6 + x^3 + x^2 + x + 1)$
0x1E7 $(x^8 + x^7 + x^6 + x^5 + x^2 + x + 1)$
0x1F5 $(x^8 + x^7 + x^5 + x^4 + x^2 + 1)$

The Galois field multiplier presented where $GF(2^8)$ is capable of performing with all powers $2^8$ and under is shown in Chart IV. For lower polynomials the coefficients at higher than the chosen power will be zeros, e.g., if $GF(2^5)$ is implemented coefficients between $GF(2^5)$ and $GF(2^8)$ will be zero. Then the prediction won't be made above that level.

For this particular example, the irreducible or primitive polynomial 0x11D in group $GF(2^8)$ has been chosen. A storage circuit 220 with storage cells 226 supplies to the Galois field linear transformer circuit a set of coefficients for predicting the modulo remainder for that particular primitive or irreducible polynomial.

An example of the GF multiplication according to this invention occurs as follows:

| Before GF( ) multiplication; Polynomial 0x11d | | | | | After GF8( ) multiplication; Polynomial 0x11d | | | |
|---|---|---|---|---|---|---|---|---|
| | 45 | 23 | 00 | 01h | | 45 | 23 | 00 | 01h |
| GF( ) | 57 | 34 | 00 | 01h | GF( ) | 57 | 34 | 00 | 01h |
| | xx | xx | xx | xxh | | 72 | 92 | 00 | 01h |

In accordance with this invention, FIG. 14, there is a third register 215 which includes a third polynomial with coefficients over a Galois field. Typically, each of the registers 214, 216, and 215 may include four byte sections of 8 bits each so that each register contains four bytes or 32 bits total. The output from register 215 is delivered to Galois field adder circuit 219 which in this embodiment includes bus 217 and number of exclusive OR gates 219, one for each bit of bus 217. The product obtained in Galois field linear transformer circuit 218 is delivered on bus 221 so that the simple product of the multiplication may be available in the Mpy register 223 in output register circuit 211 whereas the combination of the product on bus 221 and the third polynomial is combined in adder circuit 219 including exclusive OR circuit 219' to provide the multiply and add or multiply and accumulate result in Mpa register 225 of output register circuit 211. For example, if the output of the Galois field multiplier system 210 is recursively feed back at input register circuit 215 while two new values are passed to input registers circuit 214 and 216 a Multiply and accumulate (MAC) is performed. On the other hand, if the output of the Galois field multiplier system 210 is recursively feed back at input register circuit 214 while two new values are passed to input registers circuit 215 and 216 a Multiply and add (MPA) is performed. In this way the entire multiplication of the polynomials in registers 214 and 216 and their addition with the polynomial in register 215 is all accomplished in one cycle of operation. The Galois field multiplier system 210 is explained more fully in U.S. patent application entitled GALOIS FIELD MULTIPLY/MULTI- PLY-ADD/MULTIPLY ACCUMULATE, Stein et al., filed Aug. 26, 2002 (AD-299J) incorporated herein by this reference.

Figure 15:
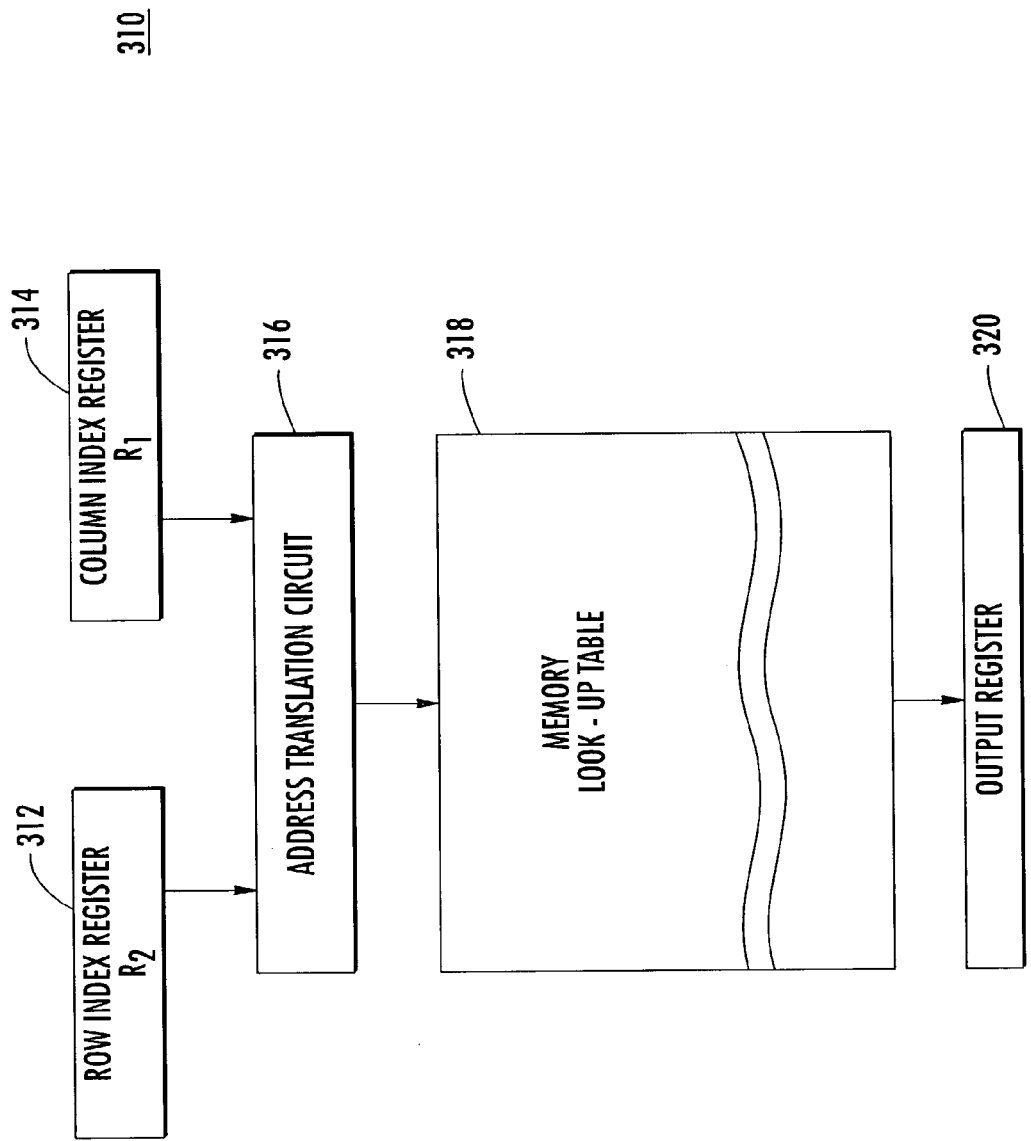
FIG. 15 is a simplified block diagram of a reconfigurable parallel look-up table system which may be used to implement this invention.

There is shown in FIG. 15 a reconfigurable parallel look-up table system 310 for implementing this invention which includes a row index register $R_2$, 312 and a column index register $R_1$, 314, an address translation circuit 316 and a memory 318 which contains a number of look-up tables. The output from memory 318 is delivered to output register 320. Memory 318 includes a number of look-up tables and row index register 312 holds the values to be looked up in those look-up tables. For example, row index register 312 may hold the angles that are to be looked up in the look-up tables at memory 318 where each of the look-up tables has a different function, one of the sine value, cosine value, tangent value, and so on for those angles. Column index register 314 stores a value representing the starting address of each look-up table stored in the memory. For example, if memory 318 holds eight look-up tables of 64 bytes each, the starting points for those look-up tables which coincide with the columns 30, 32, 34, 36, 38, 40, 42, 44 will be 0, 64, 128, 192, 256, 320, 384, and 448. Address translation circuit 16 combines the value in the row index register 312 with a representation of the starting address of each of the look-up tables to simultaneously generate an address for each value in the index register to locate in parallel the function of those values in each look-up table. Parallel look-up table system 310 is more fully explained in U.S. patent application Ser. No. 10/131,007, RECONFIGURABLE PARALLEL LOOK UP TABLE SYSTEM, Stein et al., filed Apr. 24, 2002 (AD-305J) incorporated herein by this reference.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

The invention claimed is:

1. A programmable data encryption engine interconnected between an input circuit and an output circuit for performing the cipher function of an advanced encryption standard (AES) algorithm, the engine comprising:
   a first parallel look-up table responsive to a first data block for implementing an AES selection function and executing the multiplicative inverse in GF-J($2^8$) and applying an affine over GF(2) transformation to obtain a subbyte transformation;
   a second parallel look-up table for transforming said subbyte transformation to obtain a shift row transformation; and
   a Galois field multiplier for transforming said shift row transformation to obtain a mix column transformation and adding a round key resulting in an advanced encryption standard cipher function of said first data block, said Galois field multiplier including a multiplier circuit for multiplying two polynomials with coefficients over a Galois field to obtain their product; a Galois field linear transformer circuit responsive to said multiplier circuit for predicting the modulo remainder of the polynomial product for an irreducible polynomial; and a storage circuit for supplying to said Galois field linear transformer circuit a set of coefficients for predicting the modulo remainder for a predetermined irreducible polynomial.

2. The programmable data encryption engine of claim 1 further including a key generator for providing a plurality of round keys to said Galois field multiplier.

3. The programmable data encryption engine of claim 2 in which said key generator includes a key generator circuit responsive to a master key to generate said round keys.

4. The programmable data encryption engine of claim 3 in which said key generator circuit includes a third parallel look-up table system for rotating said master key to obtain a rotated subkey.

5. The programmable data encryption engine of claim 4 in which said key generator circuit includes a fourth parallel look-up table system for executing a multiplicative inverse in $GF^{-1}(2^8)$ and applying affine over GF(2) transformation to obtain said round keys.

6. The programmable data encryption engine of claim 5 in which said first and second parallel look-up tables and said first Galois field multiplier perform a number of rounds of transformations and there is a round key generated for each round.

7. The programmable data encryption engine of claim 6 in which each said round key includes a plurality of subkeys.

8. The programmable data encryption engine of claim 1 in which said Galois field multiplier further includes:
   a Galois field adder circuit for adding said product of said multiplier circuit with a third polynomial with coefficients over a Galois field for performing the multiply and add operations in a single cycle.

9. The programmable data encryption engine of claim 1 in which a said parallel look-up table includes:
   a memory;
   a plurality of look-up tables stored in said memory;
   a row index register for holding the values to be looked up in said look-up tables;
   a colunm index register for storing a value representing the starting address of each said look-up table stored in said memory; and
   an address translation circuit responsive to said column index register and said row index register to simultaneously generate an address for each value in said row index register to locate in parallel the functions of those values in each look-up table.

10. A programmable data encryption engine interconnected between an input circuit and an output circuit for performing the cipher function of an advanced encryption standard (AES) algorithm, the engine comprising:
   a parallel look-up table system responsive in a first mode to a first data block for implementing an AES selection function and executing the multiplicative inverse in GFI (2s) and applying an affine over GF(2) transformation to obtain a subbyte transformation and in a second mode to said subbyte transformation to transform said subbyte transformation to obtain a shift row transformation; and
   a Galois field multiplier for transforming said shift row transformation to obtain a mix column transformation and adding a round key resulting in an advanced encryption standard cipher function of said first data block, said Galois field multiplier including a multiplier circuit for multiplying two polynomials with coefficients over a Galois field to obtain their product; a Galois field linear transformer circuit responsive to said multiplier circuit for predicting the modulo remainder of the polynomial product for an irreducible polynomial; a storage circuit for supplying to said Galois field linear transformer circuit a set of coefficients for predicting the modulo remainder for a predetermined irreducible polynomial.

11. The programmable data encryption engine of claim 10 in which said parallel look-up table system is responsive to a master key in a third mode to obtain a subkey and is responsive to said subkey in a fourth mode to generate a round key.

12. The programmable data encryption engine of claim 11 in which said parallel look-up table system includes a first parallel look-up table for implementing said subbyte transformations and a second parallel look-up table for complimenting said shift row transformations.

* * * * *